(12) United States Patent
Hatta et al.

(10) Patent No.: US 10,090,568 B2
(45) Date of Patent: Oct. 2, 2018

(54) BATTERY ASSEMBLY

(71) Applicant: NISSAN MOTOR CO., LTD., Yokohama-shi, Kanagawa (JP)

(72) Inventors: Kentaro Hatta, Kawasaki (JP); Ryo Sakamoto, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 674 days.

(21) Appl. No.: 14/402,934

(22) PCT Filed: Jun. 26, 2013

(86) PCT No.: PCT/JP2013/067500
§ 371 (c)(1),
(2) Date: Nov. 21, 2014

(87) PCT Pub. No.: WO2014/010419
PCT Pub. Date: Jan. 16, 2014

(65) Prior Publication Data
US 2015/0171488 A1 Jun. 18, 2015

(30) Foreign Application Priority Data
Jul. 11, 2012 (JP) ................................ 2012-155126

(51) Int. Cl.
*H01M 10/48* (2006.01)
*H01M 2/20* (2006.01)
*H01M 2/30* (2006.01)

(52) U.S. Cl.
CPC ......... *H01M 10/486* (2013.01); *H01M 2/204* (2013.01); *H01M 2/30* (2013.01)

(58) Field of Classification Search
None
See application file for complete search history.

(56) References Cited

U.S. PATENT DOCUMENTS

| 2010/0092845 A1* | 4/2010 | Spare | H01M 2/1022 429/90 |
|---|---|---|---|
| 2011/0070474 A1* | 3/2011 | Lee | B60L 3/0046 429/120 |
| 2013/0130081 A1 | 5/2013 | Diez et al. | |

FOREIGN PATENT DOCUMENTS

| CN | 103140959 A | 6/2013 |
|---|---|---|
| DE | 102010031380 A1 | 1/2012 |
| JP | 2001-272422 A | 10/2001 |
| JP | 2002-246074 A | 8/2002 |
| JP | 2004-055490 A | 2/2004 |
| JP | 2004-055492 A | 2/2004 |
| JP | 2004055492 A | 2/2004 |

(Continued)

*Primary Examiner* — Miriam Stagg
*Assistant Examiner* — Carmen V Lyles-Irving
(74) *Attorney, Agent, or Firm* — Young Basile Hanlon & MacFarlane, P.C.

(57) ABSTRACT

A battery assembly has excellent performance for sensing temperature by a temperature sensing element. The battery assembly includes a bus bar for electrically connecting the battery or cell units to each other by connecting electrode members provided with the battery or cell unit. The battery assembly further includes a bus bar extension portion extended from the bus bar. The bus-bar extension portion is disposed out of the area between the adjacent electrode members and provided with a temperature sensing or detection element that detects the temperature of the battery or cell unit.

3 Claims, 4 Drawing Sheets

(56) References Cited

FOREIGN PATENT DOCUMENTS

| JP | H2008-039571 | 2/2008 |
| JP | 2012064555 A | 3/2012 |
| WO | 2011153055 A2 | 12/2011 |

* cited by examiner

BATTERY ASSEMBLY

CROSS REFERENCE TO RELATED APPLICATION

This application claims priority to Japanese Patent Application No. 2012-155126 filed on Jul. 11, 2012, the disclosure of which is hereby incorporated by reference in its entirety.

TECHNICAL FIELD

The present invention relates to a battery assembly.

BACKGROUND

Conventionally, as a battery mounted in an electrically driven vehicle such as a hybrid or electric vehicle, a battery pack or assembly is known, which is formed by combining a plurality of battery modules. The individual battery module is in turn constituted by connecting one or more unit cells wherein the unit cell represents a minimum unit or element of the battery. For example, as the unit battery, such as a lithium ion secondary battery is used. The battery pack or assembly such as these is provided with a bus bar to connect unit cells or battery modules each other.

In such a conventional battery assembly, a method is used to monitor the temperature increase and the like due to heat generated during charge and discharge, according to which, by sensing the temperature of the bus bar by a temperature sensing element, the temperature of the battery assembly associated is equivalently detectable. Note that, for example in JP 2001-272422 A, it is disclosed that a temperature detecting element is provided on a bus bar disposed between vehicle electrical equipment and a battery terminal.

SUMMARY

However, since Joule heat due to the flow of current is also applied to the bus bar, depending on the degree of heat applied, this may pose a disturbance and pose a problem of deterioration in sensing accuracy of the temperature of the battery assembly. The present invention has been made in view of the above circumstances, and the objective of the present invention resides in providing a battery assembly excellent in performance of sensing temperature by a temperature sensing element.

In order to solve the problem, a battery assembly according to the present invention includes a plurality of battery or cell units, each comprising a positive electrode member and a negative electrode member both being disposed in one edge of the cell unit for flowing electric current. Further provided is a bus bar for electrically connecting the battery or cell units to by connecting the positive electrode members and the negative electrode members respectively with a bus bar extension portion extended from and integrally formed with the bus bar. The bus-bar extension portion is disposed outside of the area between the adjacent electrode members and provided with a temperature sensing or detection element that detects the temperature of the battery or cell unit.

DETAILED DESCRIPTION OF THE EMBODIMENTS

Figure 1:
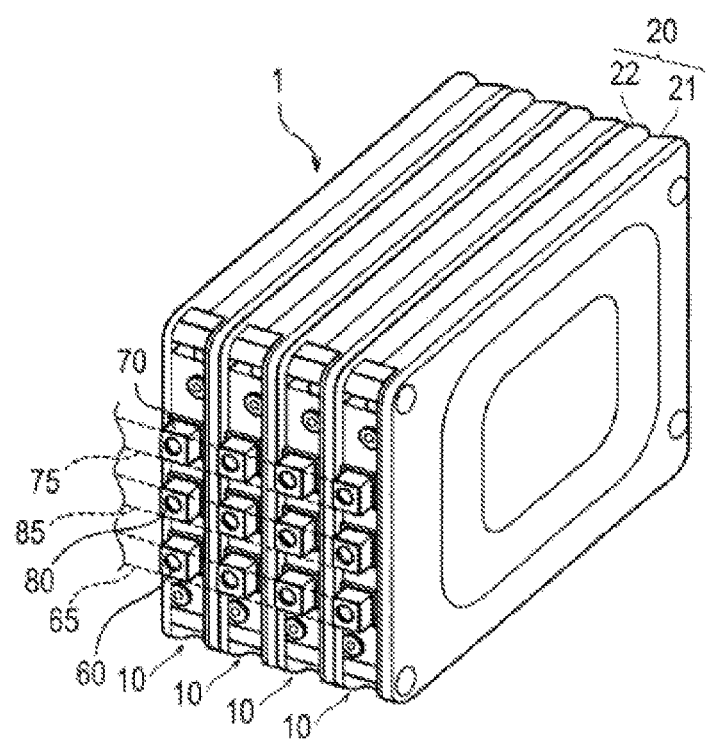
FIG. 1 is a perspective view schematically showing a battery assembly.

FIG. 1 is a perspective view schematically showing the battery pack 1 pertaining to the embodiment. A battery pack or assembly 1 is intended to be used as a battery of an electrically driven vehicle such as an electric vehicle, and is configured as a battery module group having an array of multiple battery modules 10. In FIG. 1, a state is shown in which, as the battery module group, four battery modules 10 are combined to each other.

Each battery module 10 forming the battery assembly 1 is electrically connected with three external bus bars 65, 75, 85. More specifically, each external output positive terminal 60 provided for a battery module 10 is connected to each other by an external bus bar 65, and each external output negative terminal 70 of each battery module 10 is connected to each other by an external bus bar 75. Further, each voltage detection terminal 80 provided in each battery module 10 is connected to one another by an external bus bar 85.

Each individual battery module 10 includes a case 20, a cell unit 30 (see FIG. 2) accommodated within the case 20. The case 20 has a box-shaped lower case 21 with its upper part being open and an upper case 22 for closing the opening of the lower case 21. The upper case 22 is attached to the lower case in a state in which the cell unit 30 is accommodated inside. Also, at the predetermined portions of the case 20, three output terminals, i.e., the external output positive terminal 60, the external output negative terminal 70, and the voltage detection terminal 80 are respectively exposed to outside.

Figure 2:
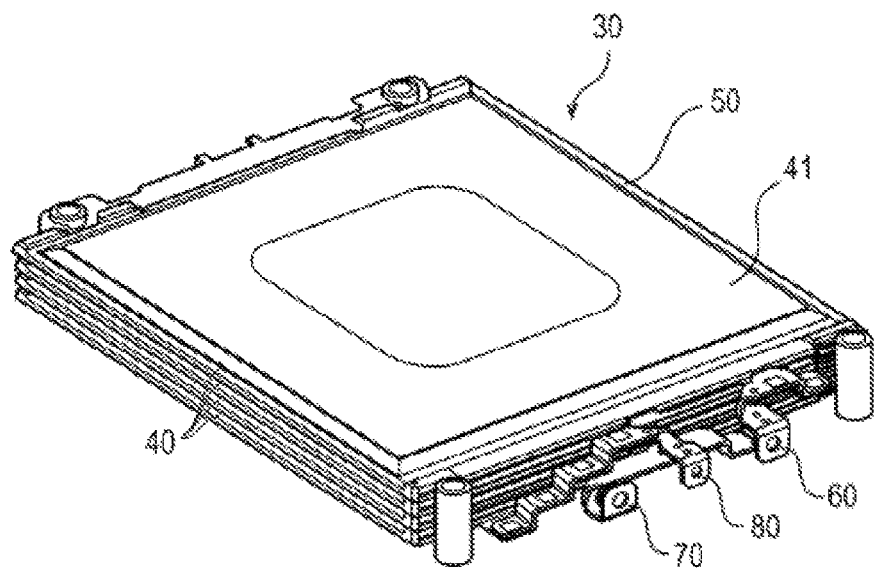
FIG. 2 is a perspective view schematically showing a cell unit.

FIG. 2 is a perspective view schematically showing the cell unit 30. The cell unit 30 includes a plurality of single or unit cells 40, a spacer 50, and three output terminals (external output positive terminal 60, external output negative terminal 70, and voltage detection terminal 80). In the example shown in the figure, the cell unit 30 has a configuration comprising four unit cells 40 and each of unit cells 40 is stacked on one another in its thickness direction.

Figure 3:
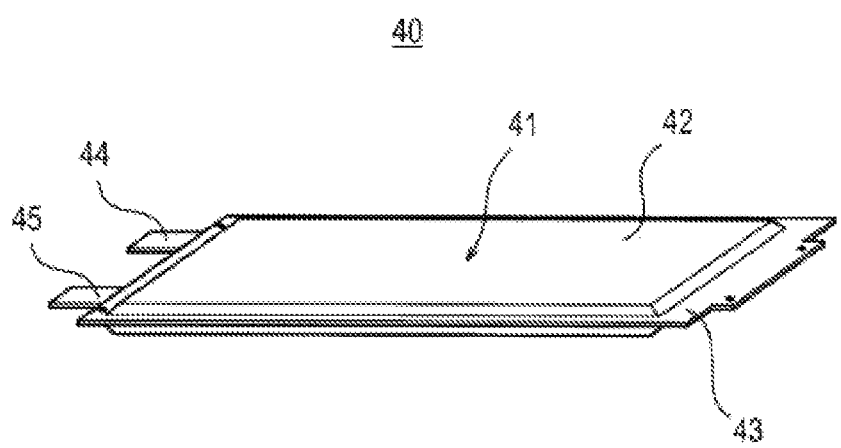
FIG. 3 is a perspective view schematically showing the configuration of a unit cell.

FIG. 3 is a perspective view schematically showing the configuration of the unit cell 40. Each unit cell 40 is mainly composed of an electrode stack or laminate, an exterior or package member housing this electrode stack. A lithium ion secondary battery is applicable as the unit cell 40. The electrode stack is composed of a positive electrode plate and a negative electrode plate, both being laminated alternately on one another interposing a separator there between. The positive electrode plate has a sheet shaped positive collector on both surfaces (or one surface) of which a positive electrode active material is applied. The positive electrode plate is further formed into a generally rectangular shape. The negative electrode plate is obtained by applying a negative electrode active material to both surfaces (or one surface) of the anode current collector sheet of the negative electrode plate and is formed into a substantially rectangular shape. The separator is a plate that functions as an insulating layer of ion permeable nature and is formed into a substantially rectangular shape.

The exterior member 41 is made up of a pair of metal composite films (laminated films and the like obtained by laminating a synthetic resin layer on both surfaces of a metal foil). Each metal composite film is formed in a rectangular shape sheet slightly larger in size than the electrode stack, and has a cup-shaped recess 42 in the center. The pair of the metal composite films are superposed on one another by abutting each peripheral edge 43 corresponding to four side edges while housing an electrolyte along with the electrode stack in a space provided by the recess 42 and subsequently welded at the peripheral edge 43 so that the outer periphery of the metal composite films are sealed over the entire outer periphery.

Also, each of the positive plate is connected to the positive electrode tab 44, which is one of the electrode tabs, while, similarly, the negative electrode plate is connected to the negative electrode tab 45, which is the other electrode tabs. The positive electrode tab 44 and the negative electrode tab 45 are drawn to the outside from one short side of the exterior member 41.

A plurality of spacers 50 is provided corresponding to the unit cells 40. Each spacer 50 is mounted to the exterior member 41, more specifically, on the peripheral portion 43 corresponding to the remaining three sides free of the electrode tabs 44, 45. The spacer functions to stack the unit cells 40 at predetermined intervals and further to suppress the deviations of individual unit cells 40 in the surface direction.

Figure 4:
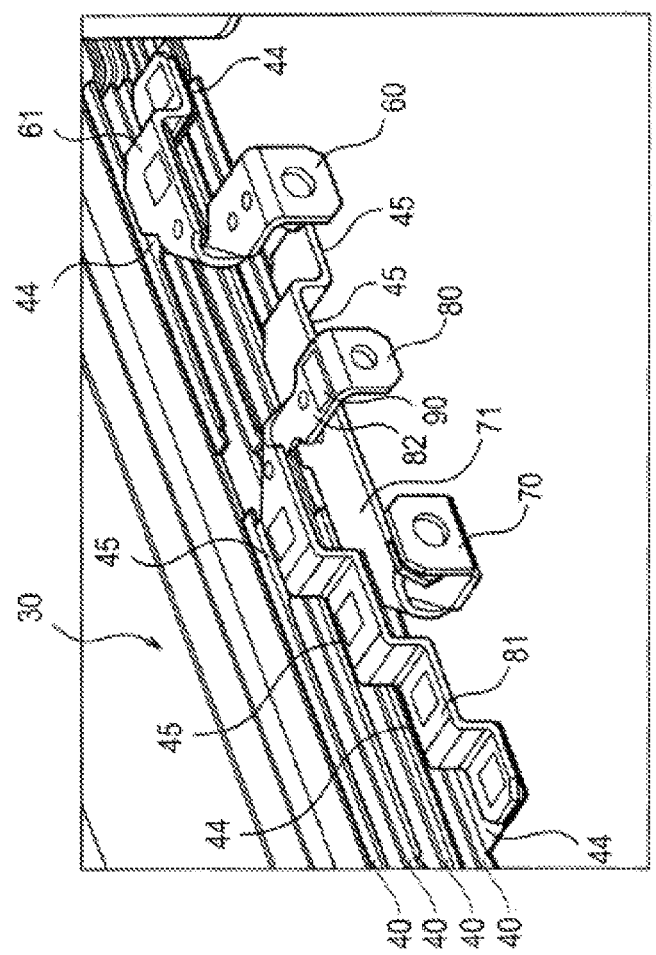
FIG. 4 is a perspective view showing an enlarged view of the vicinity of a cell unit.

FIG. 4 is a perspective view showing an enlarged view of the vicinity of the output terminals of the cell unit 30. The terminals of the cell unit 30 are made up of an external output positive terminal 60, an external output negative terminal 70, and a voltage detection terminal 80. The external output positive terminal 60 and the external output negative terminal 70 are intended to output the power to the outside from the cell unit 30, and to charge to the cell unit 30 using electric power supplied from the outside. On the other hand, the voltage detection terminal 80 is an output terminal for detecting the voltage of the unit cell 40 constituting the battery module 10. The output terminals 60, 70, and 80 are connected to the electrode tab 44, 45 of each unit cell 40 via the bus bar 61, 71, 81.

As shown in the FIG. 4, the positive electrode tab 44 of the top positioned unit cell 40 and that of the unit cell 40 positioned in the second from the top are electrically connected to the external output terminal 60, respectively. The electrical connection between each positive electrode tab 44 and the external output electrode terminal 60 is established by joining respective positive tabs 44 on the bus bar 61 integrally formed with the external output positive electrode terminal 60 by ultrasonic welding or the like. Further, a negative electrode tab 45 of the top positioned unit cell 40, a negative electrode tab 45 of the unit cell 40 positioned in the second from the top, a positive electrode tab 44 of the unit cell 40 positioned in the third from the top, and a positive electrode tab 44 of the unit cell 40 positioned on the lowermost side are respectively connected electrically to the voltage detection terminal 80. The electrical connection between these electrode tabs 44, 45 and the voltage detection terminal 80 is established by joining respective tabs 44, 45 on the bus bar 81 integrally formed with the voltage detection terminal 80 by ultrasonic welding or the like. Furthermore, a negative electrode tab 45 of the unit cell 40 positioned in the lowermost and a negative electrode tab 45 of the unit cell 40 positioned in the third from the top are respectively connected to the external output negative terminal 70 electrically. The electrical connection between respective negative electrode tabs 45 and the external output negative electrode terminal 70 is established by joining respective negative electrode tab 45 on the bus bar 71 integrally formed with the external output negative electrode terminal 70 by ultrasonic welding or the like.

As described above, the electrode tab 44, 45 of each unit cell 40 are connected via the bus bar 61, 71, 81 to the external output positive electrode terminal 60, the external output negative electrode terminal 70 and the voltage detection terminal 80, respectively. In the present embodiment, the cell unit 30 has a structure of connecting two sets of unit cells in series, each set including two unit cells connected in parallel to each other.

As one of the features of this embodiment, at the end portion of the bus bar 81 connected to the voltage detection terminal 80, a bus bar extension portion 82 is provided between the electrode tabs 44, 45 and the voltage detection terminal 80. Specifically, in the bus bar 81 of rectangular shape on which joint portions of the electrode tabs 44 and 45 are arranged in the longitudinal direction, the bus bar extension 82 is provided at the end portion in the longitudinal direction. The bus bar extension 82 is provided with a temperature sensing element 90 for sensing the temperature of the battery module 10 composed of each unit cell 40. As the temperature sensing element 90, a thermistor or the like may be used.

Figure 5:
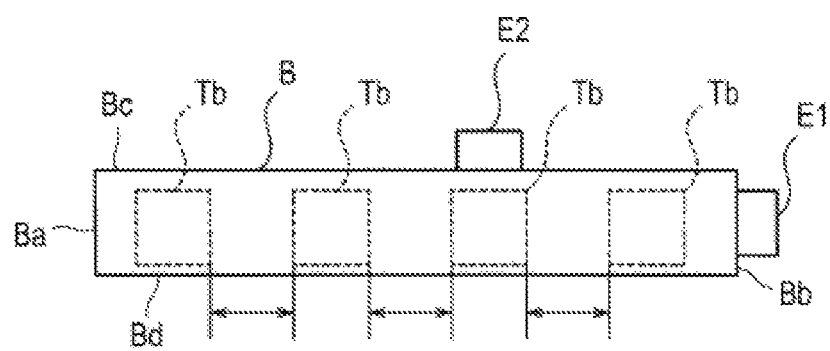
FIG. 5 is a diagram schematically illustrating the structure of the bus bar extension.

FIG. 5 is a diagram schematically illustrating a configuration of the bus bar extension portions E1, E2. In FIG. 5, the ends on the short edge side are defined by Ba, Bb while the ends on the long edge side are defined by Bc, Bd, respectively. A plurality of joining portions with the electrode tab Tb (either the positive electrode tab 44 or the negative electrode tab 45) is located in the bus bar B. In such a configuration of the bus bar B, the bus bar extension portions E1, E2 are disposed out of the area or region between the adjacent electrode tabs. Note that the reference E1, E2 schematically shows the specific example of the bus bar extension portion on the rectangular shaped bus bar on which the joining portions with the electrode tab Tb are arranged longitudinally. For example, the bus bar extension portion E2 is disposed in a position at the end Bc on the long edge side corresponding to the electrode tab Tb. The bus bar extension portion 82 shown in FIG. 4 is illustrated in a specific form of the bus bar extension portion E1 provided at the end Bb on the short edge side in FIG. 5.

In the battery assembly 1 shown in this embodiment as described above, the area between the adjacent electrode tabs 44, 45 presents the main route of current flow from one electrode tab 44 and 45 to the other electrode tab 44 and 45. However, the bus bar extension portion 82 is intended to be positioned outside of the main route. By placing a temperature sensing element 90 on the bus bar extension portion 82 of this structure, the temperature sensing element 90 will also be disposed in a position deviated from the main path. Thus, since a situation in which the joule heating due to electric current is dominant may be prevented, it is possible to improve the detection accuracy of the temperature.

Figure 6:
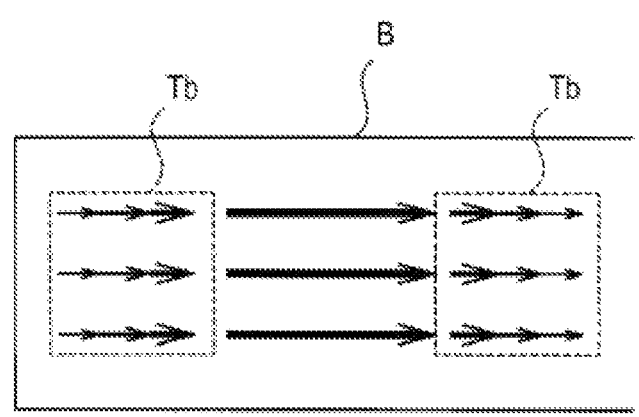
FIG. 6 is a diagram schematically illustrating the flow of current in the bus bar.

FIG. 6 is a diagram schematically showing the current flow in the bus bar B in FIG. 5. The arrows in the figure indicate the flow of current and the thickness thereof indicates the magnitude of the current. When considered in relation to two adjacent electrode tabs Tb, in the bus bar B, although current also flows in the junction area of the electrode tab Tb, there is a tendency that current is the greatest in the area between the neighboring electrode tabs Tb. In contrast, in a direction of current flow in the area between the adjacent electrode tabs Tb (i.e., in the direction connecting the adjacent tabs Tb), the magnitude of current tend to decrease as the distance from the electrode tab Tb increases. In other words, as the distance increased from the electrode tab Tb in the direction of current flow, generation of joule heating will be smaller. Stated another way, in the bus bar of rectangular shape, on which the junction or joining portions with the electrode tab Tb are disposed in the longitudinal direction, the ends Ba, Bb on the short edge side will provide the position in which generation of Joule heating is small. By providing the bus bar extension portion E1 to the end Bb on the short side, it is possible to suppress a situation in which Joule heating due to current greatly affects to thereby improve sensing accuracy of the temperature.

According to the present embodiment, the bus bar extension portion 82 is provided in the position or part where Joule heat generated is small in the bus bar 81. Thus, with respect to the temperature sensing element 90, it is possible to suppress the influence of Joule heat by electric current to thereby improve the detection or sensing accuracy of the temperature.

Note that, in the present embodiment, the bus bar extension portion 82 for attaching the temperature sensing element 90 is provided on the bus bar 81 connected to the voltage detection terminal 80. However, this embodiment is not limited to this connection. Rather, the connecting may be made to wide variety of bus bars connected to the battery module such as to the bus bar 61 connected to the external output positive terminal 60 or the bus bar 71 connected to the external output negative terminal 70.

However, the voltage detection terminal 80 is set to the cell unit 30 as described above. Therefore, the bus bar 81 which corresponds to the voltage detection terminal 80, a bus bar extension 82 for arranging the temperature sensing element 90 By the, can be annexed to the bus bar 81 equal to the voltage detection terminal 80 and the temperature sensing element 90. Thus, it is not necessary to add a bus bar to place the temperature sensing element 90, which can reduce the number of parts, thereby making it possible to reduce the size of the bus bar shapes, to achieve the above effects with an inexpensive structure I could.

A description has been described above of a battery assembly pertaining to the embodiment of the present invention. However, the present invention is not limited to the above-described embodiment, and various modifications are possible within the scope of the invention. For example, in the present embodiment, a bus bar extension is applied on a bus bar that connects unit cells each other through an electrode tab, the bus bar extension may be applied to a bus bar for connecting battery modules together through an output terminal (i.e., for the external bus bar). Even in such form, the present invention will produce the effects similar to the embodiment described above. Thus, in this embodiment, any form of battery or cell unit which is connected by a bus bar may be realized. In other words, the form of cell unit may be a unit cell, i.e. a minimum unit, or a battery module including one or more of the unit cells or minimum units. Further, the electrode member may be an electrode tab when the battery or cell unit is a unit cell. When the cell unit is a battery module, it may be an output terminal as well.

The invention claimed is:

1. A battery assembly comprising:
   a plurality of cell units consisting of first cell units and second cell units, the first cell units comprising a first cell unit and the second cell units comprising a second cell unit, each cell unit of the plurality of cell units having at least a first side and a second side and comprising:
      a positive electrode member disposed in the first side; and
      a negative electrode member disposed in the first side;
   a voltage detection terminal;
   a bus bar of rectangular shape, connected to the voltage detection terminal at an end of the bus bar, for electrically connecting the plurality of cell units to each other, wherein the positive electrode members of the first cell units and the negative electrode members of the second cell units are connected to the bus bar, the bus bar comprising:
      junction portions arranged in a longitudinal direction, wherein the junction portions are positioned in a stepped configuration, and wherein
         each positive electrode member of a respective first cell unit is connected to the bus bar at a respective first junction portion of the junction portions,
         each negative electrode member of a respective second cell unit is connected to the bus bar at a respective second junction portion of the junction portion, and
         each respective first junction portion is different from each respective second junction portion;
   a bus bar extension extended from the bus bar at the end of the bus bar and in a direction perpendicular to a direction of the bus bar, wherein the bus bar extension is disposed outside a main route of current flow between any two adjacent electrode members connected by the bus bar; and
   a temperature sensing element disposed at a tip of the bus bar extension and that detects a temperature of the cell unit.

2. The battery assembly according to claim 1, wherein each cell unit of the plurality of cell units is a unit cell constituting a minimum unit of battery element, and the electrode member is an electrode tab provided with the unit cell.

3. The battery assembly according to claim 1, wherein each cell unit is a battery module constituting one or more of minimum units of battery element, and the positive electrode member and the negative electrode member are output terminals provided with the battery module.

* * * * *